United States Patent [19]

Coupland

[11] 4,057,128
[45] Nov. 8, 1977

[54] SLACK ADJUSTERS FOR VEHICLE BRAKES

[75] Inventor: Ralph Coupland, Lincoln, England

[73] Assignee: Clayton Dewandre Company Limited, Lincoln, England

[21] Appl. No.: 655,500

[22] Filed: Feb. 5, 1976

[30] Foreign Application Priority Data

Feb. 12, 1975 United Kingdom .................. 5943/75

[51] Int. Cl.² ............................................. F16D 65/56
[52] U.S. Cl. .......................... 188/79.5 K; 188/196 BA
[58] Field of Search .................... 188/79.5 K, 196 BA

[56] References Cited

U.S. PATENT DOCUMENTS

| 3,351,163 | 11/1967 | Sander et al. | 188/79.5 K X |
| 3,724,607 | 4/1973 | Reinecke | 188/79.5 K |
| 3,901,357 | 8/1975 | Reitz et al. | 188/79.5 K |
| 3,921,765 | 11/1975 | Swander | 188/79.5 K |

Primary Examiner—Duane A. Reger
Attorney, Agent, or Firm—Norris and Bateman

[57] ABSTRACT

A slack adjuster to be used in association with the actuating cam of an internal expanding shoe type brake comprises a body member embodying a brake-actuating arm movable around the axis of the cam shaft, a worm rotatably mounted in the body member and meshing with a worm wheel keyed to the cam shaft, a member oscillatably mounted on the body member and cooperating with a non-rotatable member to impart motion to the worm through a sprag clutch when a predetermined angular movement of the brake-actuating arm is exceeded, and a friction clutch also in the drive from the oscillatable member to the worm and operable to dis-engage the drive if attempt is made to rotate the worm while it is still under braking load.

7 Claims, 3 Drawing Figures

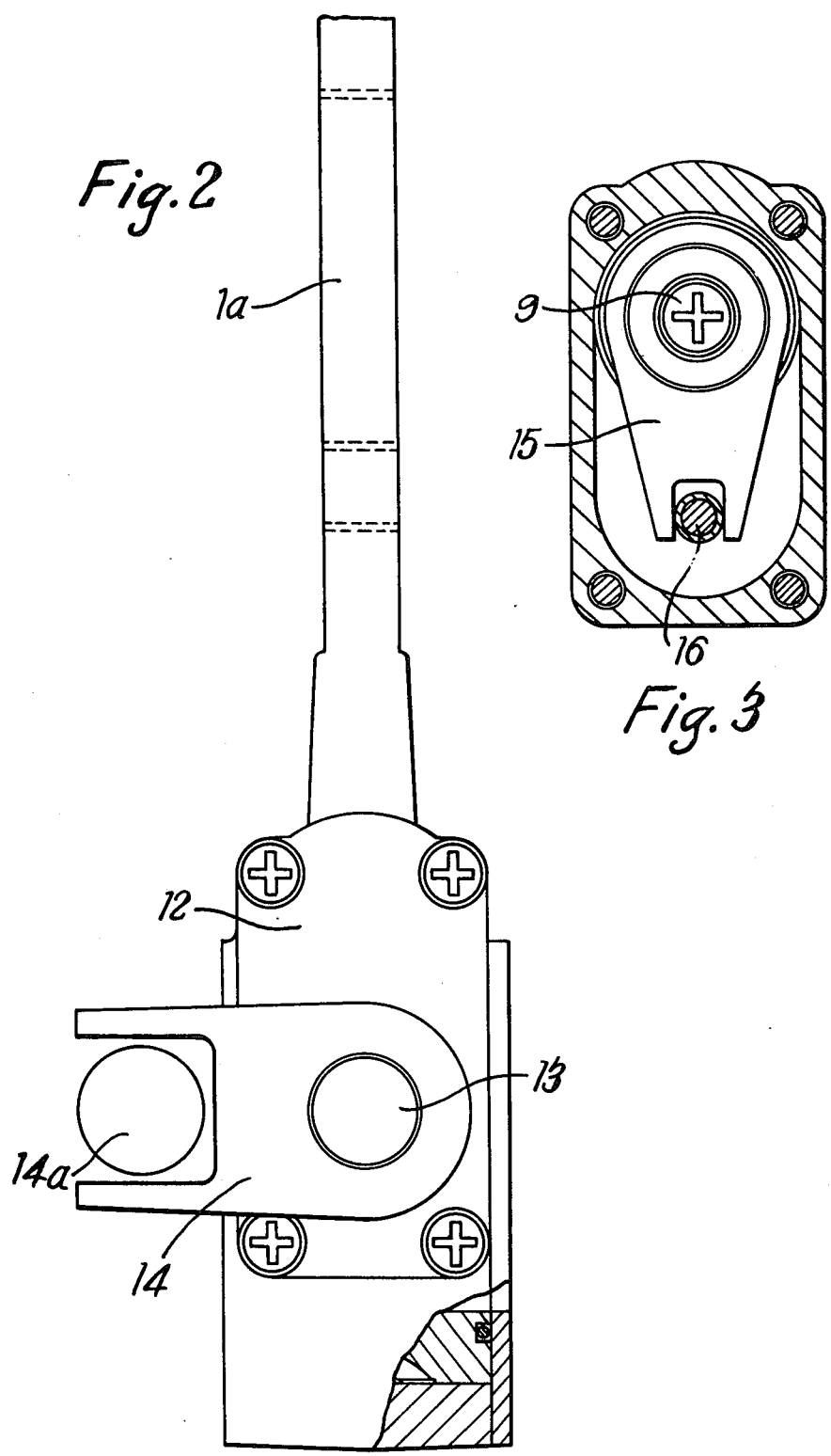

SLACK ADJUSTERS FOR VEHICLE BRAKES

This invention relates to slack adjusters for vehicle brakes and particularly to automatic slack adjusters of the kind commonly used in association with the actuating cam of internal expanding shoe type brakes and comprising a worm wheel adapted to be keyed or splined on to the brake cam shaft, a body member attached to or formed integrally with a brake actuating arm movable around the axis of the cam shaft, a worm rotatably mounted in the body member and meshing with the worm wheel and means for automatically rotating the worm to adjust the angular position of the worm wheel relative to the brake actuating arm when a pre-determined angular movement of said arm is exceeded, said means including a member oscillatably mounted on the body member and co-acting with a fixed member to impart motion through a uni-directional clutch to the worm. The object of the present invention is to provide an improved slack adjuster of this kind and in particular to safe-guard the adjuster mechanism against damage should it perform an adjusting stroke before brake loading on the worm has been removed.

According to the invention the uni-directional clutch is a sprag clutch and there is interposed in the drive to the worm and in addition to said sprag clutch a friction clutch which automatically dis-engages if an attempt is made to rotate the worm whilst it is still under brake loading.

The invention will now be described in more detail and with reference to the accompanying drawings, wherein:

FIG. 2 is a part sectional end view thereof, and

FIG. 3 is a fragmentary sectional view on the line III—III of FIG. 1.

Figure 1:
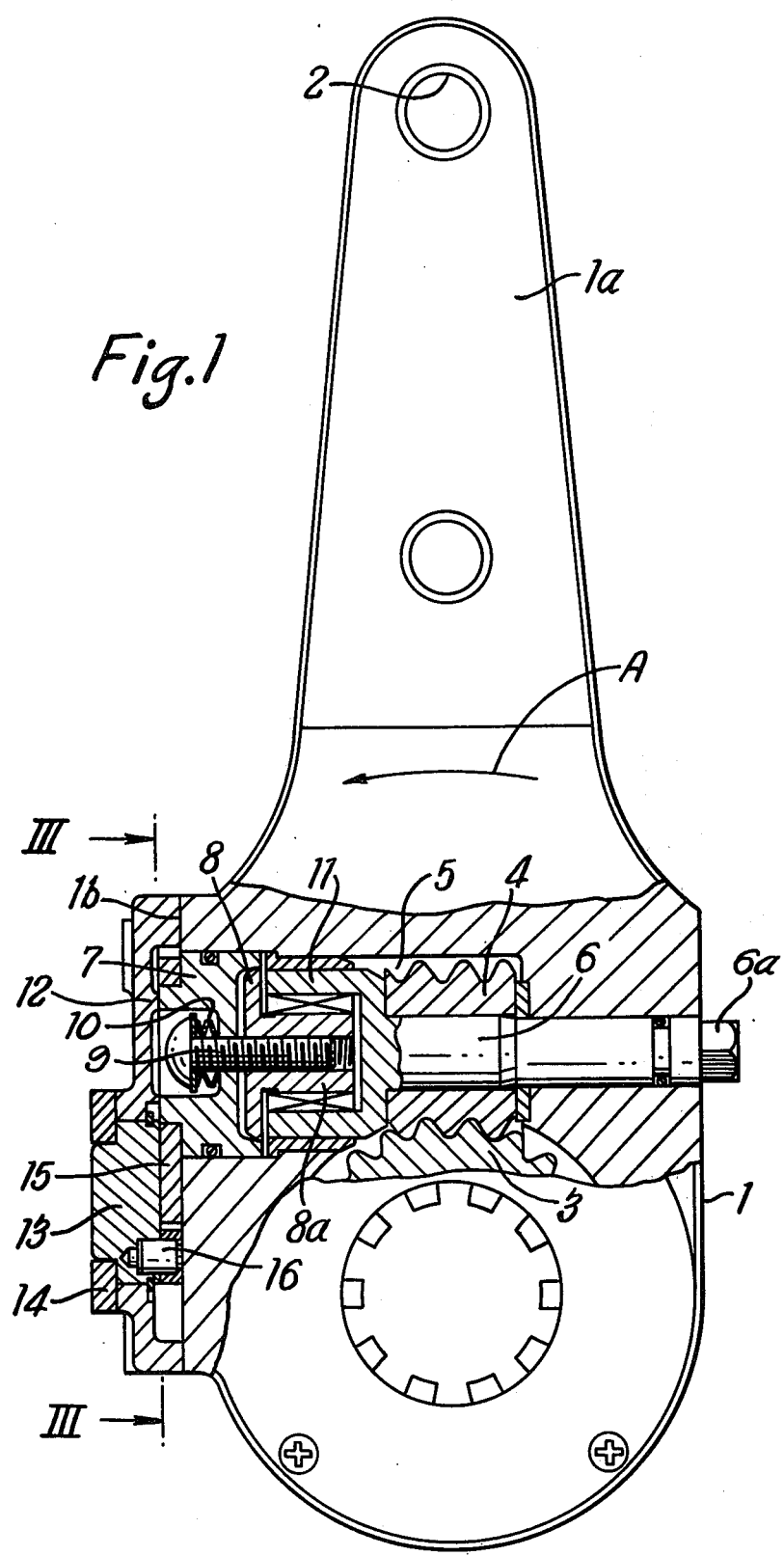
FIG. 1 is a part sectional side view of one embodiment of the slack adjuster.

The adjuster shown is of conventional form in that it comprises a banjo-shaped body member 1, the upper end of which constitutes a brake-actuating arm 1a and is formed at 2 for attachment to a brake rod or like brake actuating gear (not shown), the body member being apertured at its lower end to receive a worm wheel 3 which in use is splined upon a brake cam shaft. The worm wheel is engaged by a worm 4 which is located in a recess 5 in the body member and is secured fast on a worm shaft 6 journaled in the body member. The recess 5 extends to the end face 1b of the body member and located in the outer end portion of the recess is a friction clutch comprising a rotatable member 7 recessed at one end to form the female part of the clutch and a disc or plate 8 received within the recessed member and constituting the male part of the clutch. A screw 9 extends with clearance through the member 7 and into a stem portion 8a of the clutch disc 8, a spring or disc spring assembly 10 beneath the head of the screw serving to urge the two clutch parts together. Located between the friction clutch and the worm 4 is a sleeve 11 formed integral with the worm shaft 6, pawls, balls or equivalent spragging elements being interposed between the sleeve 11 and the stem 8a to form a one-way sprag clutch providing uni-directional drive from the stem to said sleeve.

Detachably secured to the end face 1b is a cover plate 12 in which is journaled a hub member 13, said member being secured to an arm 14 constituting the oscillatable member and which is forked to receive with clearance a stud 14a or other member fast with the chassis or the fixed brake structure whereby when the arm is rocked in the direction of the arrow A to apply the brake the arm 14 and its hub member 13 rotate relative to the body 1. Fast on the outer end of the clutch member 7 and accommodated in a recess in the cover plate 12 is a lever 15, the free end of this lever being slotted to receive a stud 16 carried by the hub member 13.

The worm shaft 6 is formed at one end as shown at 6a for application of a tool to rotate the worm manually when setting up the linkage.

The slack adjuster operates in the following manner: Under normal operating conditions movements imparted to the arm 1a of the body member by the brake operating gear are transmitted rigidly through the worm and worm wheel to the brake cam shaft. During these movements the arm 14 will move relative to the stud 14a but, assuming that the degree of slack in the system is not excessive, the brake will be applied before the clearance between the arm and the stud is taken up. If, however, due to excessive slack developing in the brake actuating linkage or to excessive shoe lining wear the arm 1a on brake application moves beyond a predetermined degree, the arm 14 will contact the stud 14a and thereafter will be rocked relative to the body 1 and, through the lever 15 and friction clutch 7, 8 will impart rotation to the inner member 8a of the sprag clutch. In this direction of rotation no movement is transmitted through the sprag clutch but on the return movement of the arm 1a rotation is transmitted from arm 14, which rocks oppositely upon again contacting stud 14a, through member 13, lever 7 and the friction clutch and through the outer member 11 of the sprag clutch and shaft 6 to the worm 4 thereby adjusting the worm wheel 3 relative to the body member 1 to take up the excessive slack in the brake linkage. If, however, the adjusting mechanism should attempt to transmit movement to the worm shaft while a braking effort is still being exerted, that is, while there is still a braking load on the worm, the friction clutch 7, 8 will slip thus safeguarding the adjusting mechanism. The friction clutch is normally set to slip at about 100 lbs/ins torque, but this figure is adjustable as previously described.

I claim:

1. An automatic slack adjuster for a vehicle brake mechanism comprising a rockably mounted actuating arm, a rotatable worm wheel on said arm meshed with said worm and adapted to be secured upon a brake camshaft, the axis of said worm being perpendicular to that of the camshaft, means connecting said arm to actuating means for rocking said arm about the axis of said camshaft during brake operation, a member pivotally mounted on said arm for oscillation about a fixed axis, means whereby said member is displaced about its pivot axis when said arm is rocked through more than a predetermined angle in the brake applying direction, motion transmitting means extending between said member and said worm comprising a unidirectional sprag clutch so constructed and arranged that whenever said arm rocks through more than said predetermined angle to rotate said camshaft in the brake applying direction the resultant pivotal displacement of said member is ineffective to rotate said worm but upon rocking of said arm in the return direction said member is effective to rotate said worm and thereby rotate said worm wheel to impart a corrective adjustment to said camshaft, a friction clutch in said motion transmitting means having frictionally engaged elements and means resiliently biasing said elements together, said biasing means providing for drive interruption in said friction clutch when the load at the brake camshaft exceeds a predetermined amount during said return movement of said member.

2. The slack adjuster defined in claim 1, wherein said friction clutch is disposed between said member and said unidirectional clutch.

3. A slack adjuster as defined in claim 1, wherein said sprag and friction clutches are coaxial with said shaft between said member and said worm, said member is directly operatively connected to an element of said friction clutch, and said sprag clutch comprises cooperating means on said shaft and an element of said friction clutch.

4. A slack adjuster as defined in claim 3, said motion transmitting means comprising a direct eccentric drive connection between said member and an element of said friction clutch.

5. An automatic slack adjuster for a vehicle brake mechanism comprising a rockably mounted actuating arm rotatably mounting a worm meshed with a worm wheel adapted to be secured upon a brake camshaft, the axis of said worm being perpendicular to that of the camshaft, means connecting said arm to actuating means for rocking said arm about the axis of said camshaft during brake operation, a member mounted on said arm for oscillation about an axis parallel to said worm axis, said member having means providing a lost motion connection to a relatively stationary part on the vehicle whereby said member is pivotally displaced on its axis when said arm is rocked through more than a predetermined angle during brake operation, unidirectional sprag clutch means interposed between said member and said worm whereby whenever said arm rocks through more than said predetermined angle to rotate said camshaft in the brake applying direction the resultant rocking displacement of said member is ineffective to rotate said worm but upon return movement rocking displacement of said member is effective to rotate said worm and thereby rotate said worm wheel to impart a corrective adjustment to said camshaft, and a friction clutch having frictionally engageable elements connected respectively to said unidirectional sprag clutch means and said oscillatable member and means resiliently biasing said elements together, said biasing means providing for drive interruption in said friction clutch when the load at the brake camshaft exceeds a predetermined amount during said return movement of said member.

6. In the automatic slack adjuster defined in claim 5, said sprag clutch comprising an outer element having an integral sleeve portion surrounding an inner portion, with components of said sprag clutch disposed directly between said sleeve and inner portions, and there being one of said friction clutch elements on one of said portions.

7. In the automatic slack adjuster defined in claim 6, means providing an eccentric pin and slotted lever drive connection between said member and an element of said friction clutch.

* * * * *